United States Patent Office 3,278,582
Patented Oct. 11, 1966

3,278,582
N-ALKYL-N-ALKOXY-AMIDES OF 2,3,5,6-TETRA-CHLOROTEREPHTHALIC ACID ESTERS
Sidney B. Richter, Chicago, and Alfred A. Levin, Skokie, Ill., assignors to Velsicol Chemical Corporation, Chicago, Ill., a corporation of Illinois
No Drawing. Filed July 27, 1962, Ser. No. 213,023
5 Claims. (Cl. 260—471)

This invention relates to new herbicidal compositions. More specifically this invention relates to the control of undesirable plant life with monoalkyl ester mono-N-alkyl-N-alkoxy-amides of 2,3,5,6-tetrachloroterephthalic acid. These compounds have the formula

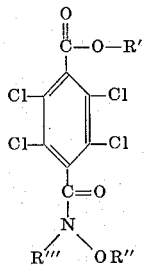

wherein R', R" and R'" are lower alkyl radicals. These new chemical compounds have marked activity as herbicides and are useful for the control of undesirable plant life, particularly crabgrass.

The new compounds of this invention described above, can be readily prepared, for example, by the partial hydrolysis of a dialkyl 2,3,5,6-tetrachloroterephthalate with an alkali metal hydroxide, such as potassium hydroxide, to form the half ester acid; chlorination of the half ester acid with a chlorinating agent, such as thionyl chloride to yield the acyl chloride; and reaction of the acyl chloride with an appropriate N-alkyl-N-alkoxyamine to form the desired product.

The hydrolysis reaction is readily performed in a solvent, such as dioxane or dioxane-methanol solution, at the reflux temperature of the solvent-reactants mixture. The half ester acid is recovered from the mixture by pouring into water, extracting unreacted diester with diethyl ether and acidifying the aqueous fraction to yield the desired material. Chlorination of the half ester acid is conveniently effected without a solvent, if thionyl chloride is used as the chlorinating agent, or at the reflux temperature of the solvent if a solvent is used. Chlorination can also be performed with other chlorinating agents with solvents at similar temperatures. Crude acyl chloride is recovered from the reaction mixture by removing the chlorinating agent, for example by heating in vacuo. The crude acyl chloride can be purified or can be used as such to react with either the free amine, or the amine hydrochloride in an aqueous solvent mixture, such as dioxane-water mixture, at normal room temperature or at slightly higher temperatures. This reaction proceeds by the addition of a base, such as potassium carbonate, to release the N-alkyl-N-alkoxyamine from its hydrochloride, and to neutralize hydrogen chloride as it formed. Crude product is obtained by separating the aqueous layer and removing the solvent by heating in vacuo. The crude product can be used for many applications as such, or can be purified by recrystallizing from a suitable solvent such as hexane. Dialkyl 2,3,5,6-tetrachloroterephthalates are known in the art and are often commercially available. It is preferred to utilize a dialkyl 2,3,5,6-tetrachloroterephthalate having lower alkyl radicals in its ester groups as the starting material in the preparation of the compounds of the present invention. One of the dialkyl radicals of the starting material will appear as R' in the compound of this invention. It is preferred that R' be an unsubstituted lower alkyl radical, i.e. an alkyl radical containing 1 to 10 carbon atoms. Typical dialkyl 2,3,5,6-tetrachloroterephthalates which are suitable as starting materials for the present invention are: dimethyl 2,3,5,6-tetrachloroterephthalate, diethyl 2,3,5,6-tetrachloroterephthalate, di-n-decyl 2,3,5,6-tetrachloroterephthalate, and the like.

The N-alkyl-N-alkoxyamine reactants suitable for use in the preparation of the present invention are amines of the formula

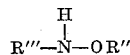

wherein R" and R'" are as previously described and appear as constituents R" and R'", respectively, in the compound of the present invention. It is preferred that in the compounds of this invention and in the amine reactant that R" and R'" are unsubstituted lower alkyl radicals, i.e., alkyl radicals having 1 to 10 carbon atoms. Exemplary of the suitable N-alkyl-N-alkoxyamine reactants are: N-ethyl-N-methoxyamine, N-methyl-N-methoxyamine, N-methyl-N-ethoxyamine, N-propyl - N - propoxyamine, N-methyl-N-pentoxyamine, N-methyl-N - n-decyloxyamine, N-ethyl-N-n-nonyloxyamine, and the like.

The manner in which the compounds of this invention can be prepared is illustrated in the following examples:

EXAMPLE I

Hydrolysis

Dimethyl 2,3,5,6-tetrachloroterephthalate (65 g.; 0.2 mol), which can be prepared as described by Rabjohn, J.A.C.S., 70, 3518 (1948), dissolved in dioxane (400 ml.) is placed into a 1 liter, three-necked flask equipped with a mechanical stirrer, reflux condenser and heating mantle. Potassium hydroxide (10.9 g.; 0.2 mol) in 130 ml. of 3:2 dioxane-methanol solution was added to the flask. The mixture was heated at reflux with stirring for six hours and then poured into one liter of cold water to precipitate unreacted dimethyl 2,3,5,6 - tetrachloroterephthalate, which upon extraction from the aqueous solution with diethyl ether and stripping of the ether yielded 33.8 g. (0.1 mol) of unreacted dimethyl 2,3,5,6-tetrachloroterephthalate. The aqueous solution was acidified with hydrochloric acid yielding an oil, which was dissolved in diethyl ether. The ethereal solution was separated from the aqueous mixture, washed with cold water, dried over magnesium sulfate, filtered free of drying agent, and stripped of diethyl ether by heating in vacuo to yield an oil, which upon trituration with pentane yielded a yellow solid. The solid was recrystallized from pentane to yield the half-ester acid melting 167–9° C., in an 82.7% yield based on recovered starting material. The half-ester acid had the following elemental analysis:

Calculated for $C_9H_4Cl_4O_4$—Theoretical, percent: C, 34.00; H, 1.27; Cl, 44.61. Found, percent: C, 34.65; H, 1.29; Cl, 43.02.

Infrared spectra of the half-ester acid indicated no dimethyl terephthalate was preesnt in the product.

EXAMPLE II

Chlorination

A mixture of the half-ester acid (8.5 g.; 0.027 mol) prepared in Example I, and thionyl chloride (50 ml.) was heated at reflux for 16 hours. The mixture was then cooled and excess thionyl chloride removed by heating under reduced pressure to yield an oil which solidified on standing. The solid was triturated with a small amount of pentane to yield crude acyl chloride melting at 82–4° C. in a 74.4% yield. The crude material had the following elemental analysis:

Calculated for $C_9H_3O_3Cl_5$—Theoretical, percent: C, 32.13; H, 0.9. Found, percent: C, 33.13; H, 1.28.

Infrared spectra of the crude material indicated no half-ester acid was present.

EXAMPLE III

*Preparation of monomethyl ester mono-N-methyl-N-methoxy amide of 2,3,5,6-tetrachloroterephthalic acid*

Crude product of Example II (25 g.; 0.074 mol) in dioxane (100 ml.) was placed into a 500 ml., three-necked, round-bottom flask equipped with a mechanical stirrer and dropping funnel. N-methoxy-N-methyl amine hydrochloride (8.2 g.; 0.085 mol) in water (20 ml.) was added to the flask with stirring. Potassium carbonate (19.6 g.; 0.142 mol) in water (100 ml.) was added dropwise to the vigorously stirred reaction mixture over a period of 1½ hours at room temperature. After the addition, stirring was continued for 8 hours with occasional warming of the flask on a steam bath. Dioxane was removed from the aqueous mixture by heating under reduced pressure, precipitating a solid as the dioxane concentration was reduced. The solid was separated from the aqueous liquid, dissolved in diethyl ether, filtered, dried over anhydrous magnesium sulfate, filtered free of drying agent, and stripped of diethyl ether by heating in vacuo to yield a viscous dark colored oil which solidified on standing. The solid was crude monomethyl ester mono-N-methoxy-N-methyl amide of 2,3,5,6-tetrachloroterephthalic acid and was recrystallized from hexane to give the purified product melting at 100–101° C., and having the following elemental analysis:

Calculated for $C_{11}H_9Cl_4NO_4$—Theoretical, percent: C, 36.59; H, 2.52; Cl, 39.28. Found, percent: C, 37.22; H, 2.66; Cl, 39.07.

The method described in the previous examples can be utilized to prepare the other compounds of the present invention, as illustrated in the following examples wherein the necessary reactants other than the reagents described in the previous examples, and the product obtained therefrom, are given:

EXAMPLE IV

Diethyl 2,3,5,6 - tetrachloroterephthalate+N - ethyl-N-methoxy amine=monoethyl ester mono-N-ethyl-N-methoxy amide of 2,3,5,6-tetrachloroterephthalic acid.

EXAMPLE V

Diethyl 2,3,5,6-tetrachloroterephthalate+N-methyl-N-ethoxy amine=monoethyl ester mono-N-methyl-N-ethoxy amide of 2,3,5,6-tetrachloroterephthalic acid.

EXAMPLE VI

Di-n-propyl 2,3,5,6-tetrachloroterephthalate+N-methyl-N-methoxy amine=mono-n-propyl ester mono-N-methyl-N-methoxy amide of 2,3,5,6-tetrachloroterephthalic acid.

EXAMPLE VII

Dimethyl 2,3,5,6-tetrachloroterephthalate+N-ethyl-N-methoxy amine=monomethyl ester mono-N-ethyl-N-methoxy amide of 2,3,5,6-tetrachloroterephthalic acid.

EXAMPLE VIII

Diethyl 2,3,5,6-tetrachloroterephthalate+N-methyl-N-n-butoxy amine=monoethyl ester mono-N-methyl-N-n-butoxy amide of 2,3,5,6-tetrachloroterephthalic acid.

For practical use as herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentartes can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE IX

*Preparation of a dust*

Product of Example III _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigwood, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and wintercress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal activity of the compounds of the present invention was illustrated, for example, by a number of experiments carried out for the control of various weeds. Many of these experiments were carried out on crabgrass. Crabgrass is a term used to describe a group of summer annuals which cause extensive damage to lawns, turf, and other grassy areas. The crabgrass kills by taking moisture and nutrients from the soil and thus smothering and choking the desirable grasses. The grasses around each crabgrass plant are usually killed or seriously weakened. When the crabgrass dies, it leaves bare spots, liberally sprinkled with enough seeds to provide serious infestation the next season. The two species of crabgrass which are the most widespread weed pests of lawns are *Digitaria ischaemum*, commonly known as smooth carbgrass, and *Digitaria sanguinalis*, usually known as common, large, hairy, tall, purple, fingergrass, turkeyfoot, crowfoot grass, and watergrass. At least fifteen other varieties of Digitaria species of crabgrass are known. Also generally classified with crabgrass are such weeds as goosegrass (*Eleusine indica*), broomsedge (*Andropogon virginicus*), pigeon grass or green bristle grass (*Setaria viridis*), yellow bristle grass (*Setaria lutescens*), watergrass (*Echinochola crusgalli*), witchgrass (*Punicum capillare*), cheatgrass or chess (*Bromus secalinus*), and downy bromegrass (*Bromus tectorum*).

To illustrate the unexpected and novel herbicidal activity of the compounds of the present invention, several presumably related compounds were prepared and tested in duplicate experiments with the compounds of this invention. For example, the compound monomethyl ester mono-amide of 2,3,5,6-tetrachloroterephthalic acid, was prepared by the reaction of the product of Example II with concentrated ammonium hydroxide to obtain the above named compound melting at 203–205° C. and having the following elemental analysis:

Calculated for $C_9H_5Cl_4NO_3$—Theoretical, percent: N, 4.42. Found, percent: N, 4.44.

Another apparently related compound which was tested in duplicate experiments with the compounds of the present invention was di-(N-methyl-N-methoxy)amide of 2,3,5,6-tetrachloroterephthalic acid. This compound was prepared from 2,3,5,6 - tetrachloroterephthaloyl chloride, which can be prepared as described by Rabjohn, J.A.C.S., 70, p. 3518 (1948). The diacid chloride was reacted with N-methyl-N-methoxy amine-hydrochloride by the procedure of Example III, to obtain a solid upon pouring the reaction mixture into water. The solid was crystallized from N,N-dimethylformamide to obtain the above named compound melting at 246–247.5° C., and having the following elemental analysis:

Calculated for $C_{12}H_{12}Cl_4N_2O_4$—Theoretical, percent: C, 36.94; H, 3.10; N, 7.18. Found, percent: C, 37.23; H, 3.36; N, 7.20.

Still another presumably related compound which was tested in duplicate experiments with the compounds of the present invention was monomethyl ester mono-N-methoxy amide of 2,3,5,6-tetrachloroterephthalic acid. This compound was prepared by reacting the product of Example II (17.2 g.; 0.051 mol) in dioxane (100 ml.) with N-methoxyamine-hydrochloride (5 g.; 0.06 mol) in water (15 ml.) by the method of Example III, utilizing potassium carbonate (14 g.; 0.102 mol) in water (100 ml.). The reaction mixture was poured into water to yield an oil, which was dissolved in diethyl ether and discarded. The aqueous layer was acidified with hydrochloric acid to Congo red to yield an oil, which was dissolved in diethyl ether. The ethereal solution was washed with water, dried over anhydrous magnesium sulfate, filtered free of drying agent and heated in vacuo to distill off the ether leaving an oily residue which solidified upon trituration with pentane. The crude compound was recrystallized from benzene to give the purified product melting at 153–155° C. and having the following elemental analysis:

Calculated for $C_{10}H_7Cl_4NO_4$—Theoretical, percent: N, 4.04. Found, percent: N, 4.04.

In one series of tests, filter paper was dipped in acetone solutions of the test compounds at various concentrations. The paper was then dried, and small pieces were placed on the bottom of plastic dishes having a film of agar nutrient and a row of crabgrass seeds set apart from the treated filter paper. The seeds were allowed to germinate under controlled laboratory conditions, and the toxicity of the chemical compounds was determined on the basis of the primary root length of the germinated seedlings, short root lengths being indicative of high toxicity to crabgrass. The results of these tests are summarized in the following table:

| Test Chemical | Primary root lengths in mm. at concns. in p.p.m. of— | | | |
|---|---|---|---|---|
| | 300 | 200 | 100 | 50 |
| Monomethyl ester mono-N-methyl-N-methoxy amide of 2,3,5,6-tetrachloroterephthalic acid (Product of Example III) | 4.5 | 5.2 | 5.9 | 9.3 |
| Monomethyl ester mono-N-methoxy amide of 2,3,5,6-tetrachloroterephthalic acid | 29.8 | 31.7 | 32.9 | 34.4 |
| Monomethyl ester mono-amide of 2,3,5,6-tetrachloroterephthalic acid | 24.4 | 23.3 | 29.0 | 30.6 |
| Di-(N-methyl-N-methoxy)amide of 2,3,5,6-tetrachloroterephthalic acid | 28.8 | 27.5 | 27.2 | 31.1 |
| Untreated check | 3.1 | 31.1 | 31.1 | 31.1 |

We claim:
1. A compound of the formula

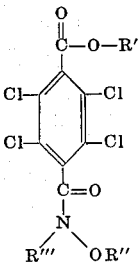

wherein R′, R″ and R‴ are lower alkyl radicals.

2. Monomethyl ester mono-N-methyl-N-methoxy amide of 2,3,5,6-tetrachloroterephthalic acid.

3. Monoethyl ester mono-N-methyl-N-methoxy amide of 2,3,5,6-tetrachloroterephthalic acid.

4. Monoethyl ester mono-N-ethyl-N-methoxy amide of 2,3,5,6-tetrachloroterephthalic acid.

5. Monomethyl ester mono-N-ethyl-N-methoxy amide of 2,3,5,6-tetrachloroterephthalic acid.

(References on following page)

References Cited by the Examiner

UNITED STATES PATENTS

| | | | |
|---|---|---|---|
| 2,454,061 | 11/1948 | Hill | 260—471 |
| 2,714,607 | 8/1955 | Matter | 260—471 |
| 2,798,087 | 7/1957 | Hotten | 260—471 |
| 2,820,814 | 1/1958 | Ginsberg | 260—471 |
| 3,014,065 | 12/1961 | Newcomer et al. | 71—2.6 |
| 3,035,910 | 5/1962 | Boyack et al. | 71—2.6 |
| 3,056,669 | 10/1962 | Moyle et al. | 71—2.6 |

LORRAINE A. WEINBERGER, *Primary Examiner.*

LEON ZITVER, *Examiner.*

M. S. JAROSZ, L. A. THAXTON, *Assistant Examiners.*

UNITED STATES PATENT OFFICE
CERTIFICATE OF CORRECTION

Patent No. 3,278,582

October 11, 1966

Sidney B. Richter et al.

It is hereby certified that error appears in the above numbered patent requiring correction and that the said Letters Patent should read as corrected below.

Column 2, line 61, for "preesnt" read -- present --; column 6, in the table, second column, line 5 thereof, for "3.1" read -- 31.1 --; column 5, lines 38 and 39, for "Echinochola" read -- Echinochloa --.

Signed and sealed this 29th day of August 1967.

(SEAL)
Attest:

ERNEST W. SWIDER
Attesting Officer

EDWARD J. BRENNER
Commissioner of Patents